Sept. 17, 1957 E. WHALEN Re. 24,355
TOY BANK
Original Filed Aug. 25, 1951
Fig. 1.
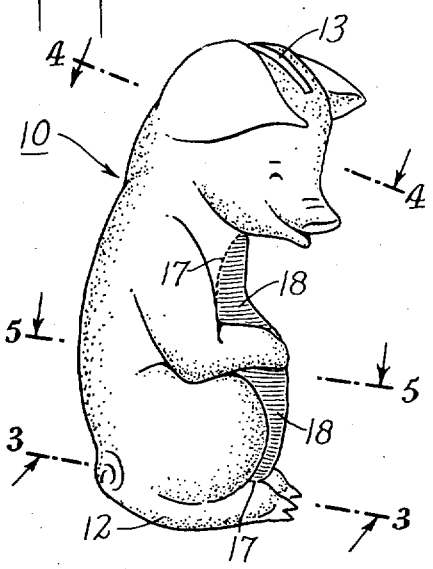
Fig. 2.
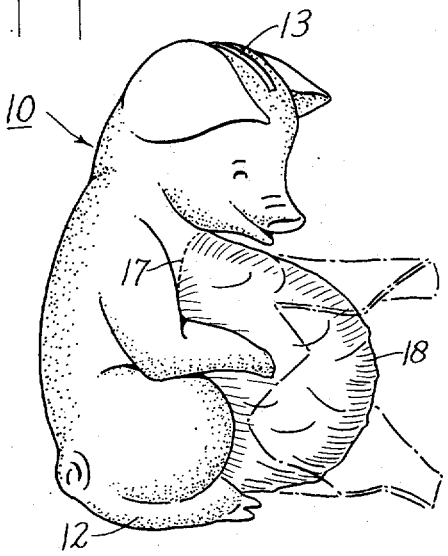
Fig. 3.
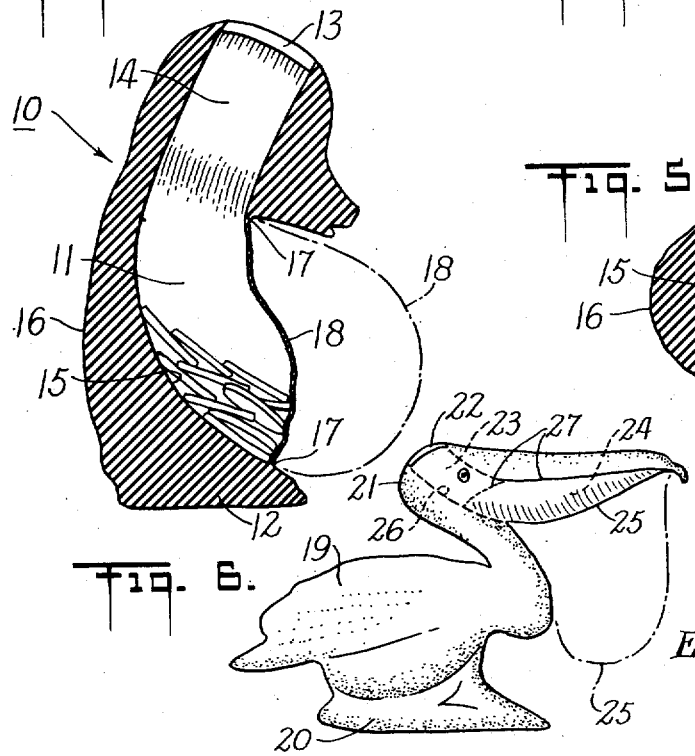
Fig. 4.
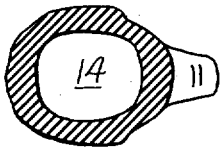
Fig. 5.
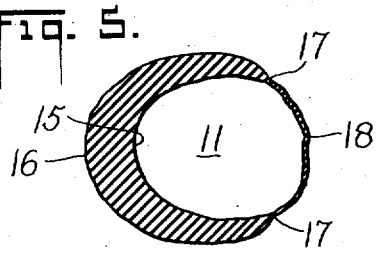
Fig. 6.
INVENTOR
Elizabeth Whalen
BY
G. G. Bassecches
her ATTORNEY United States Patent Office Re. 24,355
Reissued Sept. 17, 1957

24,355

TOY BANK

Elizabeth Whalen, New York, N. Y.

Original No. 2,768,472, dated October 30, 1956, Serial No. 243,725, August 25, 1951. Application for reissue May 10, 1957, Serial No. 658,907

3 Claims. (Cl. 46—2)

Matter enclosed in heavy brackets [ ] appears in the original patent but forms no part of this reissue specification; matter printed in italics indicates the additions made by reissue.

This invention relates to a toy bank, and more particularly to a toy bank which evidences changes in contour during use in saving.

It is an object of my invention to provide a toy bank which provides an incentive to continued saving by showing evidence of the effect of depositing coins or like legal tender into the receptacle by a change in contour of the bank.

More specifically, it is an object of my invention to provide a toy bank simulating, in a measure, some live object which, in life, would evidence growth and change in contour as a result of feeding, and to use this change as a stimulus to saving.

More specifically, it is an object of my invention to provide a toy bank of simulated animation as a result of depositing coins to its interior, comprising the storage chamber, to the point where a portion of the body normally associated with growth evidences change, as the coins or the like are deposited within the bank.

Still more particularly, it is an object of my invention to provide a toy bank which takes on a change in contour as coins are deposited therein and relies on the gravitational influence of the coins in the bank to augment the change in dimensions, involving differentially distensible materials, one of which is distensible to the point in an embodiment thereof where it breaks and releases the contents when the maximum distension has been achieved.

Still more particularly, it is an object of my invention to provide a toy bank made of rubber or like distensible material in which a portion thereof is formed with such distensibility that the deposition of coins or the like to its interior will evidence distension or growth thereby to create interest by the analogy to the growth or change in form of the [ljve] *live* object, such as a human or animal which it simulates.

To attain these objects and such further objects as may appear herein or be hereinafter pointed out, I make reference to the accompanying drawing, forming a part hereof, in which:

Figure 1 is a perspective view illustrating a toy bank in accordance with one embodiment of my invention before use;

Figure 2 is a similar view after extended use with coins saved therein;

Figure 3 is a section taken on the line 3—3 of Figure 1;

Figure 4 is a section taken on the line 4—4 of Figure 1;

Figure 5 is a section taken on the line 5—5 of Figure 1;

Figure 6 is a side elevation of another embodiment of my invention.

Making reference to the drawing, the toy bank is illustrated by me in the form of a simulated pig sitting on its haunches and has a body portion casing or shell 10 made of rubber or similar moldable material outlining a hollow section or chamber 11 above the base 12 representing its haunches. The hollow section 11 at the top of its head has a coin slot 13 with which a passage 14 connects to the hollow section 11. The hollow section or chamber 11 includes a downwardly inclined wall 15 leading to the passage 14, spaced from the outer surface 16 to provide a relatively indistensible chamber, and to so direct the coins deposited through the slot 13 that they slide toward the chamber segment limited by the annular rim 17. But for the incident friction, I prefer the coins dropped in the slot 13 to slide to edge 17 readily. A thin membrane 18 of readily distensible material, such as sheet rubber, covers and is connected to the rim 17 to close the cavity 11, and but for this covering the coins would slide past the rim. The membrane 18 may be ornamented to carry out the simulation of the belly of the pig, in the illustration given.

I prefer to make the membrane 18 of sheet rubber which has the distensible characteristics of toy balloon rubber sheeting. Other sheeting may be used, in accordance with the susceptibility to distension which it is desired to effect, in simulating growth or change in size.

I have illustrated rubber constituting the main body of the animal and employing a sheet rubber of balloon distensibility for the membrane 18. Such construction may lend itself readily to simultaneous molding of an integral construction, employing for the body a rubber composition which, when vulcanized, will result in a relatively rigid material compared with the membrane 18, whose composition is likewise altered when cured to give a wide degree of stretch or distension.

It will be observed, however, that I may, instead of producing an integral construction, produce the body from relatively rigid materials, such as pottery, plaster of Paris or ceramics, and leave the edges 17 free to have connected thereto and to be covered by a separately attached membrane of the desired distensible character.

While I have described and illustrated a toy in the form of a pig, it will be understood that the analogy of growth may be carried out with other objects, and for this purpose I have illustrated in Figure 6 a simulation of a pelican in which the body 19, is supported upon the base 20 constituting its feet. Greater attraction may be given to this, as well as the original embodiment, by giving it some whimsical appearance.

The head 21, as is the body, is formed of relatively indistensible or rigid or semi-rigid material. A coin slot 22 is formed in the head and leads to a passage 23 to the bill cavity portion 24. The upper portion of the bill is rigid and the lower portion of the bill has the representation of the gular pouch made of a distensible membrane 25, as is the membrane 18 in the prior embodiment. Here, too, an inclined wall 26 which is provided from the passage to the cavity of the bill 24 assures gravitational movement of the coins to the chamber defined by the annular edges 27, which are covered by the membrane 25, and assures a quick response of the weight of the coins to change the contour of the membrane.

Known to me is the provision of toy banks in which the effect of growth is attempted by expansion, as where a so-called "piggy-bank" is formed by filling one or two hemi-spherical segments through a slot against the tension of an enveloping covering of knit material or rubber sheeting. Such bank does not evidence growth until after a full condition of the sphere or spheres is achieved. In accordance with my invention, progressive growth is promptly evidenced as said chamber contents are directly sensible and compressible to the touch through the closure formed by the membranes 18 and 25, whereby to feel the coins and contents in said chamber by manipulation.

Having thus described my invention and illustrated its use, what I claim as new and desire to secure by Letters Patent is:

1. In a toy bank having an animate shell or casing which is provided with a head portion having a coin slot, *and* a coin receiving chamber [and a passage from said slot to said chamber], said chamber being outlined by wall portions of the shell positioned with respect to the coin slot [and passage] so that gravitationally [the] coins may [slide] *move* directly unobstructed to said chamber, [a portion] *said wall portions* of said shell being positioned with respect to the coin slot [and passage] so that gravitationally the coins may [slide] *move* directly unobstructed thereagainst and being formed of distensible material to enclose the chamber and solely to support the coins within said chamber from [sliding] *moving* downwardly and outwardly thereof, said [portion] *wall portions* being responsive to the weight of the coins to be progressively distended with the addition of coins to the chamber and [said] *the* chamber contents being directly sensible and compressible to the touch through the [closure] *wall portions,* whereby to feel the coins in said chamber by manipulation.

2. In a toy bank having an animate shell or casing which is provided with a head portion having a coin slot, a coin receiving chamber and a passage from said slot to said chamber, said chamber being outlined by relatively rigid walls constituting a portion of the shell and terminating in an annular rim and positioned with respect to the coin slot and passage so that gravitationally the coins may slide directly unobstructed to said rim and a closure of distensible material connected to said rim to provide the sole means to enclose the chamber and cover said rim and solely to support the coins within said chamber from sliding over said rim, said closure being responsive to the weight of the coins to be progressively distended with the addition of the coins to the chamber and said chamber contents being directly sensible and compressible to the touch through the closure whereby to feel the coins in said chamber by manipulation.

3. In a toy bank having an animate shell or casing which is provided with a coin slot at an upper portion thereof, a coin receiving chamber at a lower portion thereof, and an inclined passage from said slot to said chamber, said chamber being outlined by relatively rigid walls constituting a portion of the shell and terminating in an annular rim and positioned so that gravitationally the coins may slide toward said rim and a distensible membrane covering and sealed to said rim, said membrane being of relatively frangible, distensible sheeting responsive directly to the weight of the coins, to be progressively distended and consisting of the sole closure for said chamber and within limits to break under the weight of the coins of the chamber.

References Cited in the file of this patent or the original patent

UNITED STATES PATENTS

| | | |
|---|---|---|
| 1,521,532 | Hansen | Dec. 30, 1924 |
| 2,065,473 | Liwschutz | Dec. 22, 1936 |
| 2,488,807 | Kimball | Sept. 7, 1948 |